(12) United States Patent
Hagedorn

(10) Patent No.: US 12,341,924 B2
(45) Date of Patent: Jun. 24, 2025

(54) SYSTEM AND METHOD FOR IMPROVED CALL HANDLING

(71) Applicant: TEXTNOW, INC., Waterloo (CA)

(72) Inventor: J. David Hagedorn, St Clements (CA)

(73) Assignee: TEXTNOW, INC., Waterloo (CA)

( * ) Notice: Subject to any disclaimer, the term of this patent is extended or adjusted under 35 U.S.C. 154(b) by 78 days.

(21) Appl. No.: 18/130,233

(22) Filed: Apr. 3, 2023

(65) Prior Publication Data

US 2024/0333834 A1 Oct. 3, 2024

(51) Int. Cl.
*H04M 3/42* (2006.01)
*H04W 60/04* (2009.01)

(52) U.S. Cl.
CPC ....... *H04M 3/42042* (2013.01); *H04W 60/04* (2013.01)

(58) Field of Classification Search
CPC .......................... H04M 3/42042; H04W 60/04
See application file for complete search history.

(56) References Cited

U.S. PATENT DOCUMENTS

| | | | |
|---|---|---|---|
| 9,407,451 B1* | 8/2016 | Mistry | H04N 1/00106 |
| 10,149,156 B1* | 12/2018 | Tiku | H04W 12/66 |
| 2008/0225727 A1* | 9/2008 | Yoshida | H04L 47/10 370/236 |
| 2016/0072955 A1* | 3/2016 | Barkan | H04M 3/543 455/417 |
| 2021/0185638 A1* | 6/2021 | Pathak | H04L 51/214 |
| 2021/0195002 A1* | 6/2021 | Yamamoto | H04L 65/1053 |
| 2021/0227389 A1* | 7/2021 | Baldwin | H04L 63/0876 |
| 2022/0263942 A1* | 8/2022 | Hamilton | H04M 3/436 |

* cited by examiner

*Primary Examiner* — Emmanuel Bayard
(74) *Attorney, Agent, or Firm* — Perry + Currier Inc.

(57) ABSTRACT

An example method includes: receiving, from a server, a call notification, the call notification including a call identifier for a call; providing a call alert to a user of the computing device; sending, to the server, a message including a registration request and the call identifier; receiving, from the server, handling parameters for handling the call; and handling the call according to the handling parameters.

20 Claims, 7 Drawing Sheets

SYSTEM AND METHOD FOR IMPROVED CALL HANDLING

FIELD

The specification relates generally to telecommunication services, and more particularly to a system and method for improved call handling.

BACKGROUND

Telecommunications services use an exchange of messages to provision the correct information to establish a communications session. However, in accordance with existing messaging standards, when messages are exchanged in quick succession, some information may be lost, resulting in alerts being generated, or requests being made with no clear resolution due to the lost information.

SUMMARY

According to an aspect of the present specification an example method includes: receiving, from a server, a call notification, the call notification including a call identifier for a call; providing a call alert to a user of the computing device; sending, to the server, a message including a registration request and the call identifier; receiving, from the server, handling parameters for handling the call; and handling the call according to the handling parameters.

According to another aspect of the present specification, an example method includes: receiving a call destined for a target account, the call having a call identifier; recording the call identifier in a call tracking repository; sending a call notification to a computing device associated with the target account, the call notification including the call identifier; receiving, from the computing device, a message including a registration request and the call identifier; in response to the registration request, determining handling parameters for the call identifier according to the call tracking repository; and sending, to the computing device, the handling parameters to the computing device.

According to another aspect of the present specification, an example device includes: a memory, an output device, and a communications interface; a processor interconnected with the memory, the output device, and the communications interface, the processor configured to: receive, via the communications interface from a server, a call notification including a call identifier for a call; provide a call alert at the output device; send, to the server, a message including a registration request and the call identifier; receive, from the server, handling parameters for handling the call; and handle the call according to the handling parameters.

According to another aspect of the present specification, an example server includes: a memory and a communications interface; and a processor interconnected with the memory and the communications interface, the processor configured to: receive a call destined for a target account, the call having a call identifier; record the call identifier in a call tracking repository; send a call notification to a computing device associated with the target account, the call notification including the call identifier; receive, from the computing device, a message including a registration request and the call identifier; in response to the registration request, determine handling parameters for the call identifier according to the call tracking repository; and send, to the computing device, the handling parameters to the computing device.

BRIEF DESCRIPTION OF DRAWINGS

Implementations are described with reference to the following figures, in which.

DETAILED DESCRIPTION

Figure 1:
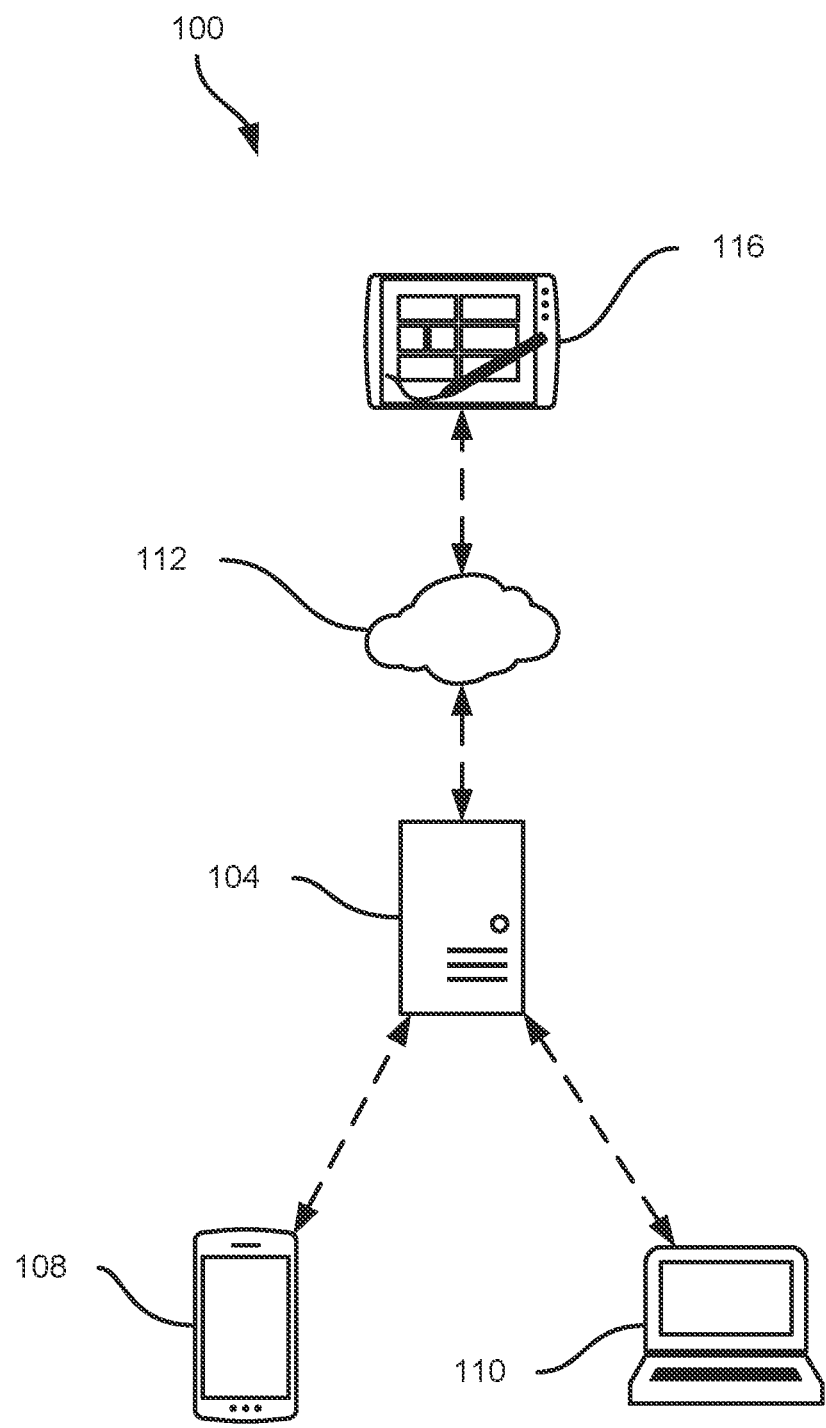
FIG. 1 depicts a schematic diagram of an example system for improved call handling.

Call services may handle calls using a series of industry-standardize communication protocols, such as the session initiation protocol (SIP) to initialize communication sessions between endpoint devices (i.e., a source device from which the communication session is initiated, and a target device for which the communication session is destined). Some call services, such as voice over internet protocol (VoIP) services may additionally employ application programming interfaces (APIs) to leverage third-party services and infrastructure, such as push notification services and the like.

However, information may sometimes be lost, causing call errors, miscommunications, and frustration for the end user, while additionally increasing the computational and communication burden on the system in attempting a failed connection. For example, after receiving an incoming call from a source device, a call service server may leverage a push notification service to notify the target device of the incoming call in order to proceed with SIP registration to initialize the communication session. Such push notification services may standardize incoming call notifications, leading to operating system requirements to respond in a certain manner. For example, in iOS-based systems, notification of an incoming call triggers a requirement to ring the target device. The target device may subsequently attempt a SIP registration by returning a registration request to the call service server. However, standard SIP registration requests do not assume the registration is in response to a pending call and do not include any identifying information about the reason for the registration. Hence if the incoming call is cancelled by the source device prior to the SIP registration completing, the call service server would be unaware the SIP registration request that was made by the target device needs to be informed that the call has been cancelled. The target device, particularly in iOS-based systems, may then experience a phantom ring, in which the device is ringing, but the call is unable to be connected, even if the user indicates that the call should be answered, since it does not know the call has gone away.

Accordingly, the present disclosure describes an example system for improved call handling using call identifiers. In particular, the system, and more specifically, the call service server, may extract the call identifier assigned to incoming calls and store status information about the call. The server may further piggy-back the call identifier, for example in custom header and/or other information fields in the call notification to the target device. The call handling application on the target device, in turn, may similarly be configured to extract the call identifier from the call notification and send a registration request including the call identifier to allow the server to look up the status about the corresponding call. The server may subsequently send appropriate handling parameters to the target device based on the current status of the corresponding call. The handling parameters may include an indication to the target device that the corresponding call was cancelled, allowing the target device to provide the end user with an indication of the cancellation and a reason for the phantom ring. In other examples, the handling parameters may include connection parameters to allow the target device to connect to the call.

FIG. 1 depicts a system 100 for improved call handling using call identifiers. The system 100 includes a call service server 104 (also referred to herein as simply the server 104), computing devices 108, 110 interconnected with the server 104, a network 112, and a second computing device 116.

The server 104 is generally configured to provide calling services to support calls between computing devices, such as the computing devices 108, 110 (also referred to herein as simply the device 108 and the device 110) and the second computing device 116. The server 104 may be any suitable server environment, including a series of cooperating servers, one or more cloud-based servers, and the like. The internal components of the server 104 will be described in greater detail below.

The computing devices 108, 110 are generally configured to support calling applications, to allow a user of the computing devices 108, 110 to engage in calls (e.g., voice calls, video calls, or the like) with a user of another computing device, such as the second computing device 116. The computing devices 108, 110 may be computing devices such as mobile phones, tablets, laptop computers, desktop computers, or the like. The internal components of the computing device 108 will be described in greater detail below.

The server 104 is in communication with the computing device 108 via one or more communication links, shown in the present example as being wireless communication links. The communication links may be wired, wireless, a combination thereof, and may traverse one or more networks, including local area networks, wide area networks, the internet, and the like. In particular, in the present example, call services and call handling for the computing devices 108, 110 is provided by the call service server 104. That is, the user of the computing devices 108, 110 may subscribe to the call service provided by the server 104. The server 104 may therefore, for example, provision a user account for the user, a telephone number associated with the user account, and the like.

The server 104 is further in communication with the network 112. The network 112 may include any number of networks, including mobile networks, wide area networks, local area networks, public switched telephone networks (PSTNs), combinations of the above, and the like.

The system 100 further includes the second computing device 116, which may be a mobile phone, a tablet, a laptop computer, a desktop computer, or the like. In the present example, the second computing device 116 may be serviced by a call service provider other than the server 104, and which may communicate with the server 104 via the network 112.

The system 100, and in particular, the server 104, is configured to track calls by their call identifiers. Further, communications between the server 104 and the device 108 are provisioned with the call identifier to allow status identification and determination of appropriate handling parameters, including in situations where a call was prematurely cancelled (i.e., prior to establishing the session). This allows information to be provided to the user as to the cause of a lack of connection to a session, and further avoids continued unnecessary time and attempts to connect (e.g., until a timeout).

Figure 2:
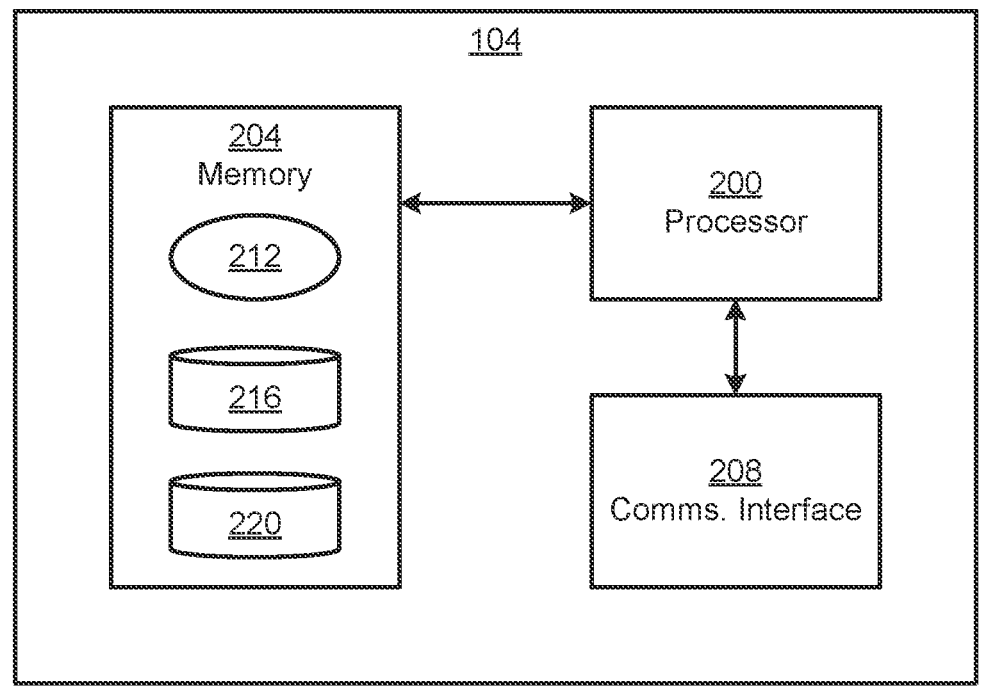
FIG. 2 depicts a schematic diagram of certain internal components of the server and the device of FIG. 1.
Figure 2:
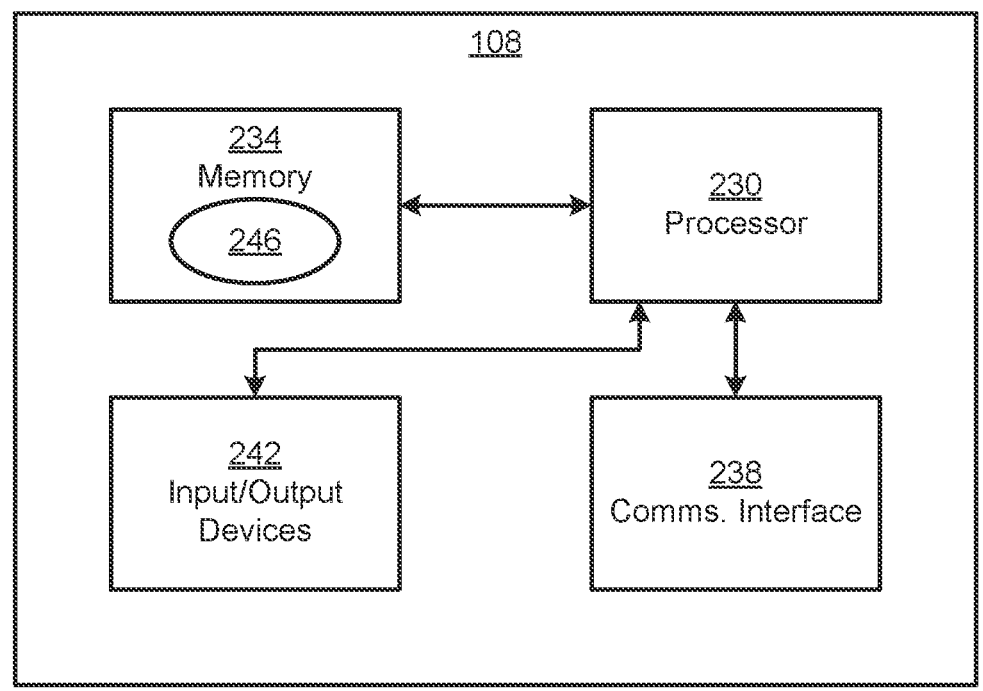

Turning now to FIG. 2, certain internal components of the server 104 and the computing device 108 are depicted in greater detail. The server 104 includes a processor 200, a memory 204 and a communications interface 208.

The processor 200 may include a central processing unit (CPU), a microcontroller, a microprocessor, a processing core, a field-programmable gate array (FPGA), or similar. The processor 200 may include multiple cooperating processors. The processor 200 may cooperate with the memory 204 to realize the functionality described herein.

The memory 204 may include a combination of volatile (e.g., Random Access Memory or RAM) and non-volatile memory (e.g., read-only memory or ROM, Electrically Erasable Programmable Read Only Memory or EEPROM, flash memory). All or some of the memory 204 may be integrated with the processor 200. The memory stores applications, each including a plurality of computer-readable instructions executable by the processor 200. The execution of the instructions by the processor 200 configures the server 104 to perform the actions discussed herein. In particular, the applications stored in the memory 204 include a server-side call handling application 212. When executed by the processor 200, the application 212 configures the processor 200 to perform various functions discussed below in greater detail and related to the call handling operation of the server 104. The application 212 may also be implemented as a suite of distinct applications. Further, Some or all of the functionality of the application 212 may be implemented as dedicated hardware components, such as one or more FPGAs or application-specific integrated circuits (ASICs).

The memory 204 also stores rules and data for the call handling operation. For example, the memory 204 may include a user account repository 216 storing user account information such as user and/or account identifiers, telephone numbers, mobile directory numbers, or the like associated with the user account, contact and billing information for the user account, computing devices associated with the user account, and the like. For example, in some examples, the devices 108, 110 may be separate computing devices associated with the same user account, while in other examples, each of the devices 108, 110 may be associated with different user accounts.

The memory 204 may further include a call tracking repository 220 storing call tracking data, including call identifiers for ongoing and/or recent calls handled by the server 104, optionally, status identifiers for each of the call identifiers, and the like. For example, some status identifiers may include 'pending' to indicate that the corresponding call has not yet been answered by the target account, 'cancelled' to indicate that the corresponding call was cancelled (e.g., by the source device), 'answered' to indicate that the target account has answered the call, and the like. In some examples, further status information may also be tracked in the call tracking repository 220. For example, when a call is answered, the corresponding entry in the call tracking repository 220 may be updated to include a device identifier (e.g., an IP address or the like) to indicate which device associated with the target account answered the call.

The server 104 further includes the communications interface 208 interconnected with the processor 200. The communications interface 208 may be configured for wireless (e.g., satellite, radio frequency, Bluetooth, Wi-Fi, or other suitable communications protocols) or wired communications and may include suitable hardware (e.g., transmitters, receivers, network interface controllers, and the like) to allow the server 104 to communicate with other computing devices. The specific components of the communications interface 208 are selected based on the types of communication links that the server 104 communicates over.

In some examples, the server 104 may further include one or more input and/or output devices (not shown). The input devices may include one or more buttons, keypads, touch-sensitive display screen, mice, or the like for receiving input from an operator. The output devices may include one or more display screens, monitors, speakers, sound generators, vibrators, or the like for providing output or feedback to an operator.

The device 108 includes a processor 230, a memory 234, a communications interface 238, and one or more input and/or output devices 242.

The processor 230 is similar to the processor 200 and may include a CPU, a microcontroller, a microprocessor, a processing core, an FPGA, or similar. The processor 230 may include multiple cooperating processors. The processor 230 may cooperate with the memory 234 to realize the functionality described herein.

The memory 234 is similar to the memory 204 and may include a combination of volatile and non-volatile memory, and all or some of the memory 234 may be integrated with the processor 230. The memory 234 stores applications, including a device-side call handling application 246. The application 246 includes a plurality of computer-readable instructions executable by the processor 230. The execution of the instructions by the processor 230 configures the device 108 to perform the actions discussed herein. The application 246 may be implemented as a suite of distinct applications. Further, some or all of the functionality of the application 246 may be implemented as dedicated hardware components.

The memory 234 also stores rules and data for the call handling operation. For example, the memory 234 may include one or more repositories, to track call logs, call identifiers, and the like.

The device 108 further includes the communications interface 238 interconnected with the processor 230. The communications interface 238 may be configured for wireless or wired communications and may include suitable hardware to allow the device 108 to communicate with other computing devices, such as the server 104. The specific components of the communications interface 238 are selected based on the types of communication links that the device 108 communicates over.

The device 108 further includes the one or more input and/or output devices 242. The input devices may include one or more buttons, keypads, touch-sensitive display screen, mice, or the like for receiving input from an operator. The output devices may include one or more display screens, monitors, speakers, ringers, sound generators, vibrators, or the like for providing output or feedback to an operator.

Figure 3:
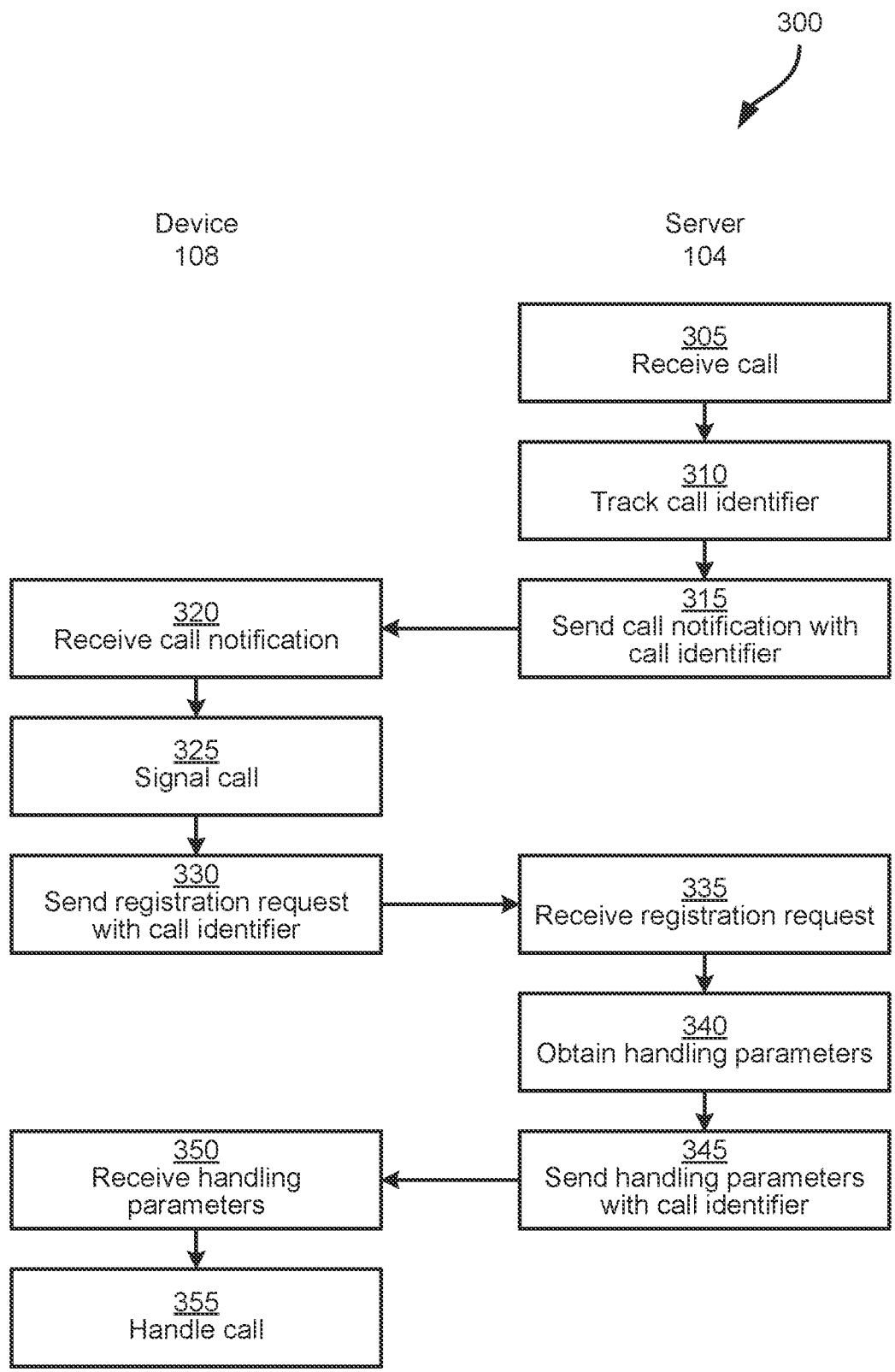
FIG. 3 depicts a flowchart of an example method for improved call handling.

Turning now to FIG. 3, the functionality implemented by the system 100 will be discussed in greater detail. FIG. 3 illustrates a method 300 of handling calls using call identifiers. The method 300 will be discussed in conjunction with its performance in the system 100, and particularly by the server 104, via execution of the application 212, and the device 108, via execution of the application 246. In particular, the method 300 will be described with reference to the components of FIGS. 1 and 2. In other examples, the method 300 may be performed by other suitable devices or systems.

At block 305, the server 104 receives an incoming call destined for a target account. For example, the target of an incoming call may be specified by a target telephone number. In particular, the incoming call may be received, in the present example, from the second computing device 116 via the network 112. That is, the second computing device 116 may act as a source device from which the incoming call originates. More particularly, the server 104 may receive the incoming call from a PSTN, another server implementing a call service for the second computing device 116, combinations of the above, or the like.

In some examples, the server 104 may receive the incoming call as a session initiation protocol (SIP) message, and more particularly, an [INVITE] message. In other examples, other suitable signaling protocols may be employed. The incoming call may have a call identifier associated with it to allow subsequent identification of the appropriate session to which the target device is to connect. The call identifier may be embedded in the SIP [INVITE] message or other signaling protocol message.

At block 310, in response to receiving the incoming call, the server 104 process the incoming call.

In particular, the server 104 may extract the call identifier from the SIP [INVITE] message, or other signaling protocol message indicative of the incoming call. The server 104 may then record the incoming call in the call tracking repository 220. That is, the server 104 is configured to create an entry in the call tracking repository 220 including the call identifier associated with the incoming call. In some examples, the call tracking repository 220 may additionally track a status of the calls tracked therein. For example, upon creation of an entry in the call tracking repository 220, the server 104 has not sent the call to the target account, and accordingly, the status associated with the call identifier in the call tracking repository 220 may indicate that the call is 'received', 'pending' or similar. In other examples, the call tracking repository 220 may simply record the call identifier. The call tracking repository 220 may further store datetime data for each of the entries, for example based on a last updated time, or the like, to allow the call tracking repository 220 to be periodically rolled over and cleared. That is, the server 104 may track a predefined rollover period, after which, the entries in the call tracking repository 220 are cleared.

Additionally, at block 310, the server 104 is configured to extract the target account and identify one or more devices associated with the target account. For example, the server 104 may retrieve, from the account repository 216, a set of devices (e.g., by Internet Protocol (IP) address or similar) associated with the target account and/or the target telephone number. For example, the server 104 may identify the device 108 as a target device, in the case that the devices 108, 110 are associated with separate accounts. In other examples, if both of the devices 108, 110 are associated with the same target user account, then both of the devices 108, 110 may be identified in the set of target devices. That is, for example, if a user has a cell phone, a desktop computer, and a tablet, each of which is logged in with the same user account, then each of the devices may be identified as a target device in the set.

At block 315, the server 104 sends a call notification to the target device identified at block 310. In examples where a set of multiple target devices is identified at block 310 as being associated with the target account, the server 104 may send a call notification to each target device in the set. Accordingly, in the present example, the call notification is sent from the server 104 to the device 108.

The call notification may be sent, for example using Firebase Cloud Messaging (FCM), Apple Push Notification service (APNs), or other suitable notification services which allow notifications to be sent to the target device. In particular, the call notification may include an indication of the call as well as the call identifier extracted and recorded in the call tracking repository at block 310.

At block 320, the device 108 receives the call notification from the server 104. In particular, the call notification includes both the indication of the call as well as the call identifier. The device 108 may extract, from the call notification, the call identifier and store the call identifier for example in the memory 234, such as in an application cache or the like.

At block 325, in response to the call notification, and more particularly, the indication of the call, the device 108 signals the incoming call to the user. That is, the device 108 generates a call alert, such as an auditory or mechanical (e.g., vibrational) ring, a visual notification (e.g., a pop-up), or the like. More particularly, the call alert may be provided using one or more of the output devices 242 of the device 108.

In some examples, the type of call alert generated may depend on the type of operating system employed by the device 108. For example, an iOS™-based device requires that the phone must ring in response to an indication of an incoming call. Accordingly, in response to the call notification, the device 108 may generate ring the device 108 (e.g., generate an auditory ring, or a vibrational ring according to volume settings on the device) to satisfy the operating system requirements. In other examples, Android-based devices, which do not have such a requirement, may simply provide a visual alert of the incoming call to the user.

At block 330, in response to the call notification, the device 108 sends a message to the server 104. The message includes a registration request and the call identifier extracted at block 320.

The registration request may be, for example, a SIP [REGISTER] message, or other standard registration request according to other signaling protocols. In standard [REGISTER] messages, the device 108 simply requests registration without identifying the call identifier. However, in the present example, the device 108 includes the call identifier in the message. For example, the [REGISTER] message may be modified to include a custom header or other additional information field including the call identifier.

At block 335, the server 104 receives the message from the device 108 and processes the message. In particular, upon detecting that the message includes a registration request, the server 104 may check the message for an embedded call identifier. For example, the server 104 may be configured to check the SIP [REGISTER] message for a predefined custom header bearing the call identifier to extract the call identifier.

At block 340, the server 104 processes the registration request in view of the call identifier to obtain handling parameters for the device 108 to handle the incoming call. That is, the server 104 is configured to check the call tracking repository 220 to determine a status for the extracted call identifier to determine appropriate handling parameters for the incoming call. Specifically, the server 104 may determine whether the call associated with the call identifier is still pending according to the call tracking repository 220. In particular, the status of the call may have changed due to various events between the time the call notification was sent to the device 108 at block 310 and the time the registration request was received by the server 104 at block 335. Such changes may be tracked in the call tracking repository 220 to provide more accurate handling parameters to the device 108 for the call.

Figure 4:
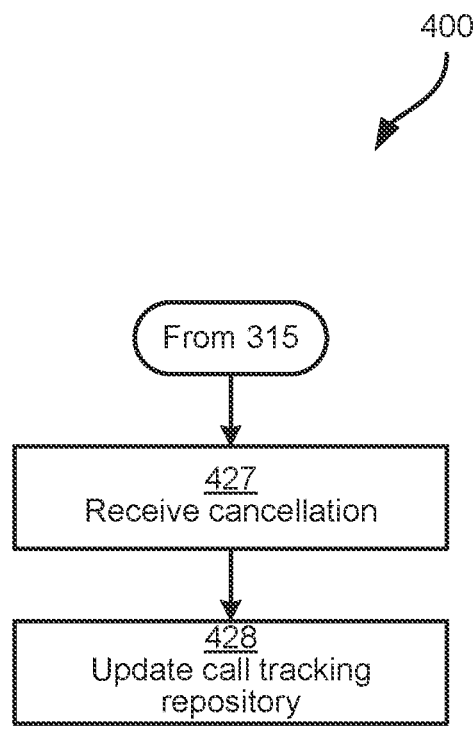
FIG. 4 depicts a flowchart of updating the call tracking repository during the method of FIG. 3.

For example, referring to FIG. 4, a flowchart of an example method 400 of handling a cancellation of a call by a source device is depicted.

In particular, the cancellation of the call may occur after sending the call notification at block 315. Accordingly, at block 427, after sending the call notification at block 310, the server 104 may receive a call cancellation from the source device, that is, the second computing device 116. In particular, the call cancellation may be received via the network 112.

The call cancellation may be a SIP [CANCEL] request or similar standardized cancellation request according to any suitable signaling protocol. The call cancellation may further include the call identifier to allow the server 104 to cancel the appropriate call.

At block 428, in response to the call cancellation, the server 104 updates the call tracking repository 220 based on the call identifier specified in the call cancellation to reflect the call cancellation.

For example, if the call tracking repository 220 includes a status for each call identifier, the server 104 may update the status to indicate that it is 'cancelled' and add a datetime stamp of the update (i.e., to allow cancelled entries in the call tracking repository 220 to be cleared periodically). In other examples, if the call tracking repository 220 does not include a status for each call identifier, the server 104 may simply remove the entry corresponding to the call identifier, since the corresponding call is no longer pending or ongoing.

After updating the call tracking repository 220 based on the call cancellation, the server 104 returns to the method 300, for example at block 335. In other examples, other updates to the call tracking repository 220 based on other call events are also contemplated. Accordingly, subsequently at block 340, the server 104 may define different handling parameters based on whether or not a call cancellation or other event has resulted in an update to the call tracking repository.

Figure 5:
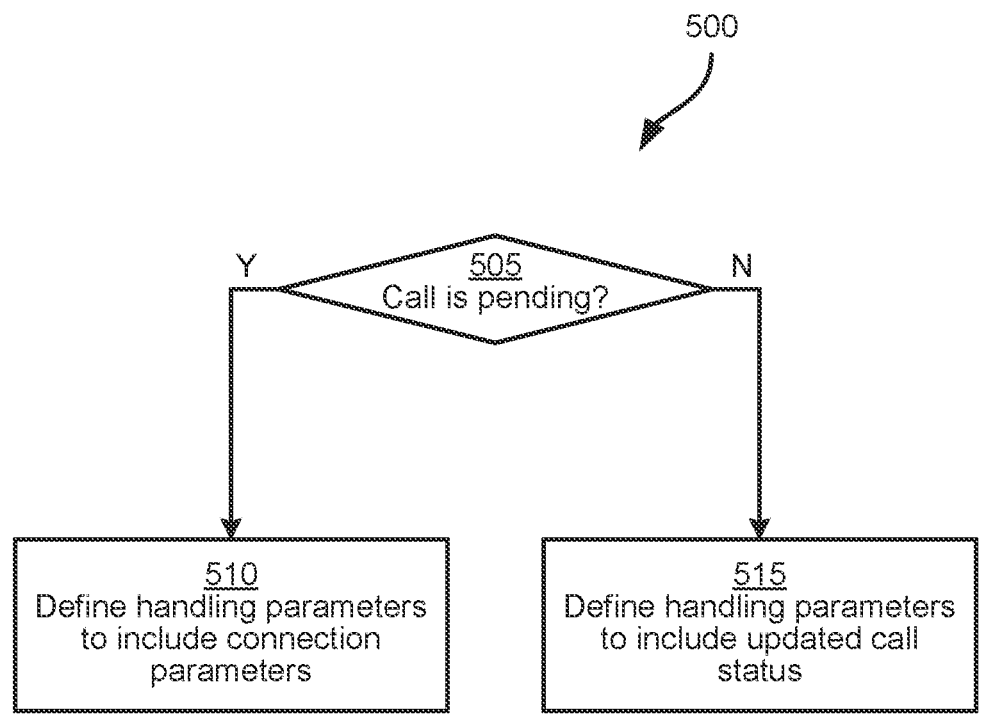
FIG. 5 depicts a flowchart of an example method of obtaining handling parameters at block 340 of the method of FIG. 3.

For example, referring to FIG. 5, a flowchart of an example method 500 of determining handling parameters is depicted.

At block 505, the server 104 determines whether the call corresponding to the call identifier is pending.

For example, if the call tracking repository 220 stores a status for each call identifier, the server 104 may check the status for the call identifier to determine whether it corresponds to a 'pending' or equivalent status. If the status is 'pending' or equivalent, then the server 104 determines at block 505 that the call corresponding to the call identifier is pending. If the status for the call identifier specifies that the associated call is 'cancelled' or 'answered' or another status, then the server 104 determines at block 505 that the call corresponding to the call identifier is not pending.

If the call tracking repository 220 does not store a status for each call identifier, the server 104 may check whether the call tracking repository 220 still includes an entry for the specified call identifier. That is, since the call tracking repository 220 may be updated to remove the entry for cancelled calls, if the call tracking repository 220 includes an entry for the specified call identifier, the server 104 may assume that the call is pending.

If the determination at block 505 is affirmative, that is, the server 104 determines that the call corresponding to the call identifier is pending, then the server 104 proceeds to block 510. At block 510, the server 104 defines handling parameters to allow the device 108 to connect to the call. That is, the handling parameters may include connection parameters included in a standard call invitation, including the call identifier, an identifier of the source device, an identifier of the target device, and the like.

For example, SIP signaling standards may be applied to communicate the handling parameters, and hence, in accordance with the standards of SIP signaling, the handling parameters may be coordinated and scheduled to be sent to the device 108 in two SIP messages, a first reply [200/OK] message, including the call identifier to signal to the device 108 that the [REGISTER] request for the specified call identifier was successful, and a second [INVITE] including the connection parameters. In other examples, other manners of obtaining and coordinating the handling parameters to be sent to the device 108 are also contemplated.

If the determination at block 505 is negative, that is, the server 104 determines that the call corresponding to the call identifier is not pending, then the server 104 proceeds to block 515. At block 515, the server 104 defines handling parameters to allow the device 108 to be notified of the updated status of the call. That is, the handling parameters may include a notification of the updated status determined for the call.

In examples where the call tracking repository 220 tracks the status for the call identifier, the handling parameters may specify the specific status recorded for the call identifier. For example, the handling parameters may specify that the call is cancelled, that the call was answered by another device, including an identifier of the other device, or the like. In examples where the call tracking repository 220 does not track the status for the call identifier, the handling parameters may be predefined to specify that the call is cancelled.

For example, the handling parameters may be scheduled to sent to the device 108 with the reply SIP [200/OK] message to signal to the device 108 that the [REGISTER] request was successfully received. However, the additional status information included in the [200/OK] reply may communicate to the device 108 that completion of the [REGISTER] request was unsuccessful due to the cancellation or other updated status of the call.

Returning to FIG. 3, after determining the handling parameters at block 340, the server 104 proceeds to block 345. At block 345, the server 104 sends the determined handling parameters with the call identifier to the device 108.

In particular, the handling parameters may be sent in accordance with the standards of SIP signaling. That is, the server 104 may first send a reply [200/OK] message to the device 108. In particular, the reply message may include the call identifier to allow the device 108 to identify which the call to which the reply message pertains. The reply message may further include the status of the call as identified by the handling parameters.

In examples where the handling parameters specify the status of the call as 'pending', sending the handling parameters at block 345 may further include sending, by the server 104, a call invitation (e.g., a SIP [INVITE] message) including the connection parameters to allow the device 108 to connect to the source device (i.e., the second computing device 116).

At block 350, the device 108 receives the handling parameters from the server 104. In some examples, receiving the handling parameters may include receiving a reply message to the registration request and, when the reply message indicates that the call is still pending, receiving an invitation with connection parameters to allow the device 108 to connect to the call.

At block 355, the device 108 handles the call according to the handling parameters. In particular, the device 108 may extract the call identifier from the handling parameters as well as the status of the call. The call identifier allows the device to apply the handling parameters to the appropriate call, if, for example, the device 108 received multiple calls in quick succession.

If the status of the call as identified by the handling parameters indicate that the call is cancelled, the device 108 may assume that no subsequent connection parameters are forthcoming and may terminate the call alert (e.g., stop ringing and/or remove any visual notifications). The device 108 may further be configured to present a cancellation alert to at one or more of the output devices 242. In some examples, the cancellation alert presented may depend on the context and current state of the device 108. For example, if the device 108 detects that the user had provided an input to answer the call, the cancellation alert may be an audio clip informing the user of the cancellation. In other examples, the cancellation alert may simply be a textual or other visual notification (e.g., a pop-up or the like) indicating that the call was cancelled.

In other examples, if the status of the call as identified by the handling parameters indicate another status, such as the call having been answered by another device associated with the target account, the device 108 may terminate the call alert and present an indication of the current status. That is, the device 108 may present a textual or other visual notification indicating that the call was answered by another device, including, for example, an identifier of the device (e.g., by IP address, or a nickname or other familiar name assigned by the user, or the like) on which the call was answered.

If the status of the call as identified by the handling parameters indicate that the call remains pending, then the device 108 may assume that further handling parameters, and in particular, connection parameters to establish the call, are forthcoming. That is, the device 108 may receive, a 'pending' status indicator as part of a reply message, and may subsequently receive a call invitation including the connection parameters for establishing the call. The device 108 may then process the connection parameters to establish the call. In some examples, as part of establishing the call, the device 108 may exchange one or more messages with the server 104. Accordingly, in some examples, the server 104 may update the status for the call identifier in the call tracking repository 220 to reflect that the call has been established, and, in some examples, an identifier for the device 108 on which the call is established.

Figure 6:
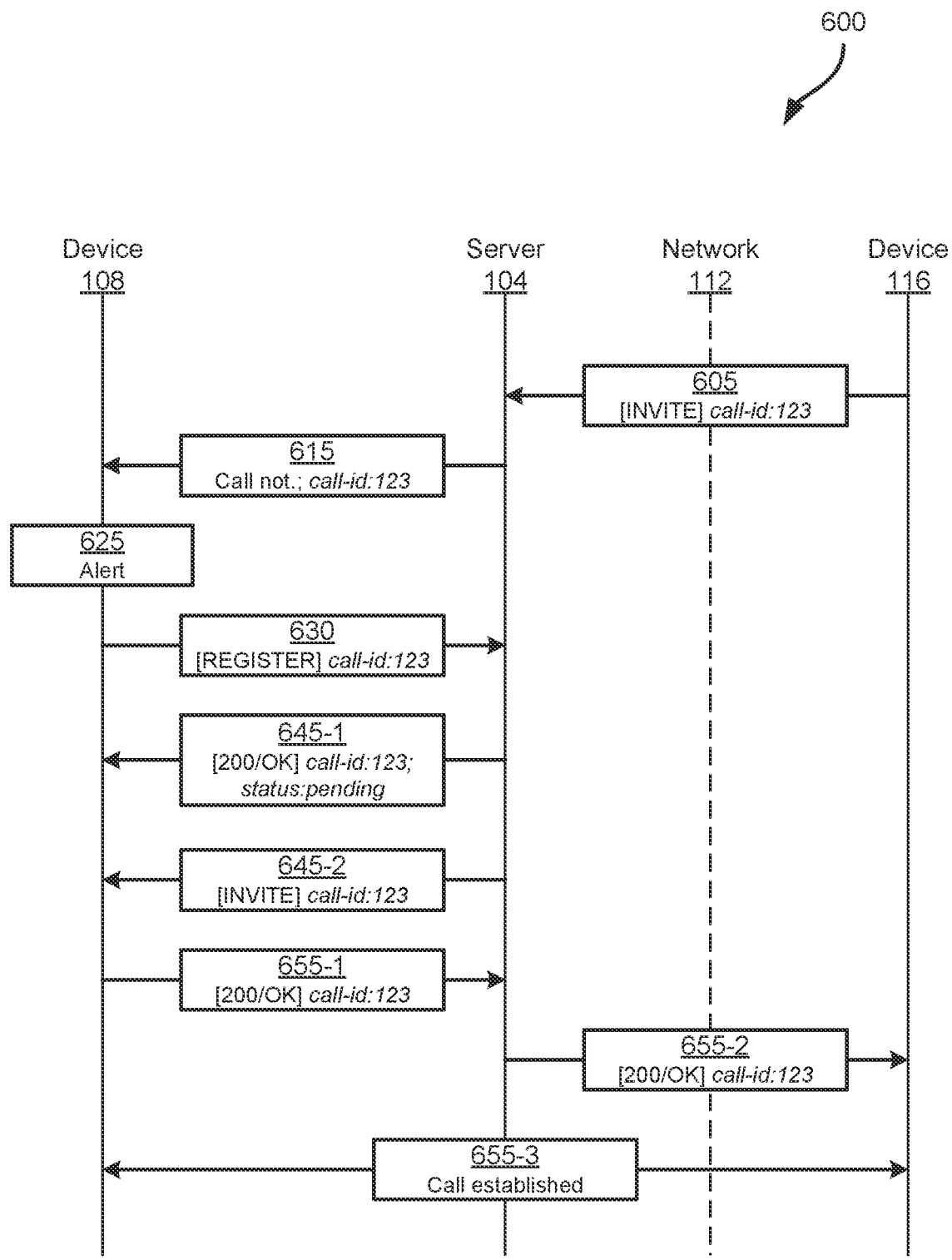
FIG. 6 depicts a schematic diagram of an example call handling operation in the system of FIG. 1.

FIG. 6 depicts a schematic diagram of a call handling operation 600 in the system 100 for a successful connected call, in accordance with the present disclosure. The operation 600 will be described in conjunction with performance of the method 300, where reference numerals of the operation 600 correspond to blocks of the method 300. Further, the operation 600 will be described in context of SIP signaling. In other examples, other suitable methods and signaling protocols may be employed to achieve the call handling operation 600.

The call handling operation 600 is initiated when the device 116 sends a call invitation 605, in the form of an [INVITE] message having a call identifier, in the present example, call-id:123. The call invitation 605 may further include source and target parameters (e.g., 'to' and 'from' fields) and the like (not shown).

The call invitation 605 may be received by the server 104 via the network 112 at block 305. The server 104 may then track the call identifier (block 310) and send a call notification 615 to the device 108 at block 315. The call notification 615 may be a push notification or similar by a third-party service. In particular, the call notification 615 includes the call identifier, call-id:123.

In response to the call notification, the device 108 generates a call alert 625 (block 325) and may return a registration request 630 (block 330). In particular, the registration request 630 includes the call identifier, call-id:123.

In response to the registration request, the server 104 obtains handling parameters, including an identification of the status of the call identifier, and, since the status is pending, connection parameters to be included in a call invitation. The server 104 may send the handling parameters (block 345) in two messages, a reply message 645-1 comprising a [200/OK] message including the pending status for the call identifier, call-id:123, and a call invitation 645-2 comprising an [INVITE] message including the call identifier, call-id:123, and other connection parameters included in a standard [INVITE] message (e.g., source and target parameters, etc.).

The device 108 may then handle the call (block 355) by establishing the call. In particular, the device 108 may return a reply message 655-1 comprising a [200/OK] message to the server 104 to, in turn, allow the server 104 to return a reply message 655-2 comprising a [200/OK] message to the device 116, via the network 112. Each of the reply messages 655-1 and 655-2 may maintain the call identifier, call-id:123, to facilitate identification of the appropriate call. A session 655-3 may then be established between the device 108 and the device 116 to support the call.

Figure 7:
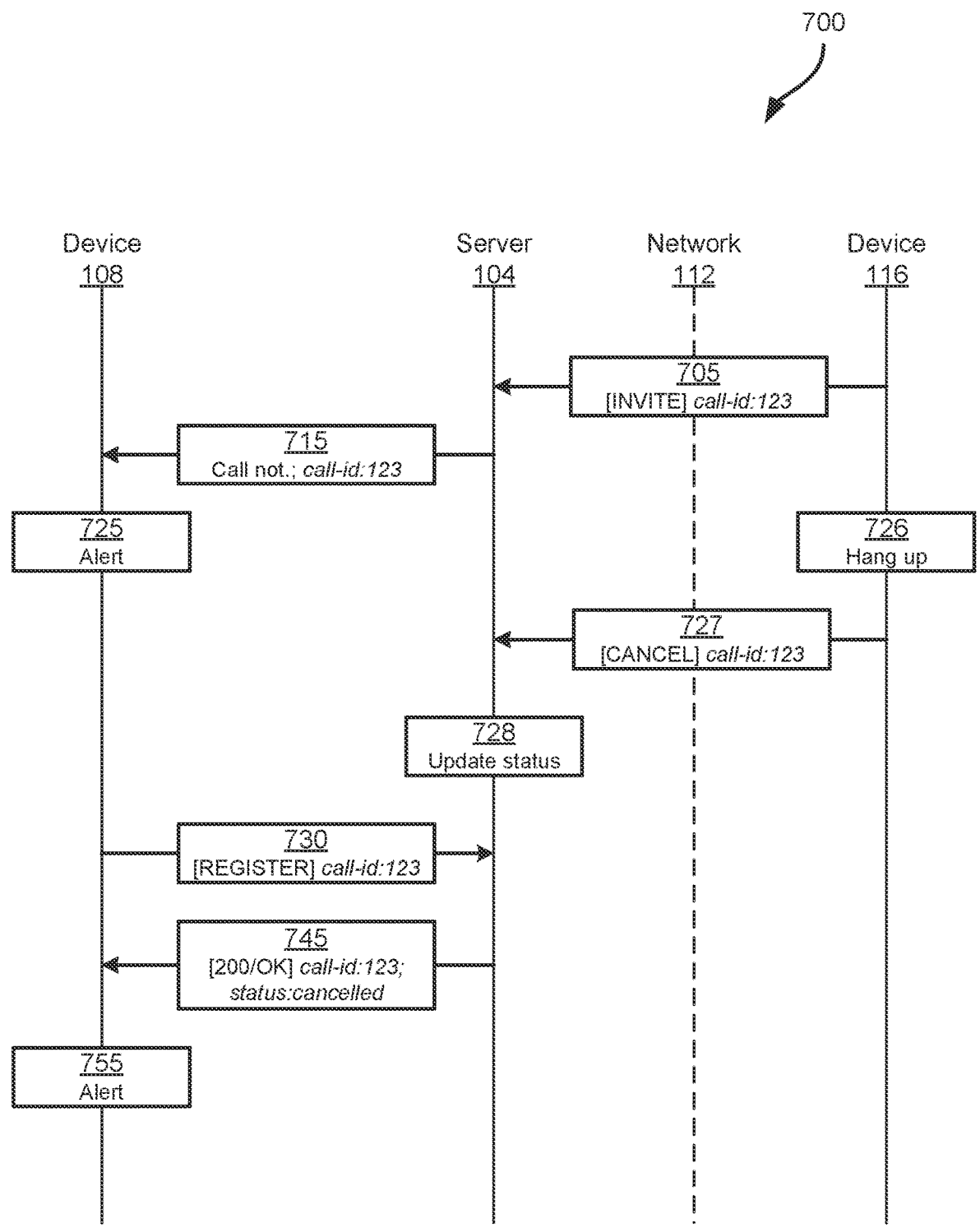
FIG. 7 depicts a schematic diagram of another example call handling operation in the system of FIG. 1.

FIG. 7 depicts a schematic diagram of a call handling operation 700 in the system 100 when a call is cancelled before registration of the target device, in accordance with the present disclosure. The operation 700 will be described in conjunction with the performance of the methods 300 and 400, where reference numerals of the operation 700 correspond to blocks of the methods 300 and 400. Further, the operation 700 will be described in context of SIP signaling. In other examples, other suitable methods and signaling protocols may be employed to achieve the call handling operation 700.

The call handling operation 700 is initiated when the device 116 sends a call invitation 705, in the form of an [INVITE] message having a call identifier, in the present example, call-id:123. The call invitation 605 may further include source and target parameters (e.g., 'to' and 'from' fields) and the like (not shown).

The call invitation 705 may be received by the server 104 via the network 112 at block 305. The server may then track the call identifier (block 310) and send a call notification 715 to the device 108 (block 315). The call notification 715 may be a push notification or similar by a third-party service. In particular, the call notification 715 includes the call identifier, call-id:123.

In response to the call notification, the device 108 generates a call alert 725 (block 325) and may return a registration request 730 (block 330). In particular, the registration request 730 includes the call identifier, call-id:123.

However, in the present example, before receiving the registration request 730 at the server 104, the user of the device 116 may hang up at 726. Accordingly, the device 116 may send a call cancellation 727 in the form of a [CANCEL] message (block 427), including the call identifier, call-id: 123.

In response to the call cancellation 727, the server 104 may update the status 728 of the call tracking repository 220 (block 428). For example, the server 104 may update the status 728 stored in the call tracking repository 220 to be 'cancelled', or the server 104 may remove the entry in the call tracking repository 220 for the call identifier, call-id: 123.

Accordingly, when the server 104 receives the registration request 730, the server 104 determines the handling parameters (block 340) based on the updated status in the call tracking repository. In particular, the handling parameters may include an identification of the status of the call identifier as cancelled. The server 104 may send the handling parameters (block 345) as a reply message 745 comprising a [200/OK] message including the cancelled status for the call identifier, call-id:123.

In response to receiving the cancelled status identifier for the call identifier call-id:123, the device 108 may handle the call by terminating the alert 725 (if the alert 725 is still ongoing) and may present a cancellation alert 755 (block 355). The cancellation alert 755 may be an audio clip informing the user of the cancellation, or a textual or other visual notification indicating that the call was cancelled. Accordingly, even if the alert 725 is provided to the user and the call is subsequently cancelled, the alert 725 is no longer provided as a phantom ring with no context or information provided to the user as to the cause. In particular, provisioning of the call identifier allows As described herein, a telecommunications system provisions the call identifier in call notification, registration requests, and other messages prior to establishing the session for the call. Accordingly, even if call alerts are generated at the target device and the call is subsequently cancelled, the call alert is no longer presented as a phantom ring with no context or information provided to the user as to the cause of the lack of subsequent connection. In particular, tracking and provisioning of the call identifier allows the call service server to provide a status to the target device, which in turn allows the target device to provide a notification to the user.

The scope of the claims should not be limited by the embodiments set forth in the above examples but should be given the broadest interpretation consistent with the description as a whole.

The invention claimed is:

1. A method in a computing device, the method comprising:
   receiving, from a server, a call notification, the call notification including a call identifier for a call;
   providing a call alert to a user of the computing device;
   sending, to the server, a message including a registration request and the call identifier;
   receiving, from the server, handling parameters for handling the call, wherein the handling parameters comprise a status identifier indicating cancellation of the call; and
   handling the call according to the handling parameters, by providing a cancellation alert to the user of the computing device.

2. The method of claim 1, wherein providing the call alert comprises one or more of: ringing the computing device and providing a visual notification at a display of the computing device.

3. The method of claim 1, wherein the handling parameters comprise a call invitation including connection parameters; and wherein handling the call comprises establishing the call according to the connection parameters.

4. The method of claim 1, wherein handling the call further comprises terminating the call alert.

5. A method in a call service server, the method comprising:
receiving a call destined for a target account, the call having a call identifier;
recording the call identifier in a call tracking repository;
sending a call notification to a computing device associated with the target account, the call notification including the call identifier;
receiving, from the computing device, a message including a registration request and the call identifier;
in response to the registration request, determining handling parameters for the call identifier according to the call tracking repository; and
sending, to the computing device, the handling parameters to the computing device.

6. The method of claim 5, further comprising storing a status associated with the call identifier in the call tracking repository.

7. The method of claim 5, further comprising:
receiving a call cancellation for the call; and
updating the call tracking repository to reflect the call cancellation.

8. The method of claim 7, wherein updating the call tracking repository comprises: removing the call identifier from the call tracking repository; or updating a status associated with the call identifier in the call tracking repository.

9. The method of claim 5, wherein determining the handling parameters comprises:
determining whether the call is pending based on the call tracking repository;
when the call is pending, defining the handling parameters to include connection parameters to allow the device to establish the call; and
when the call is not pending, defining handling parameters to include a notification of an updated status of the call.

10. The method of claim 5, further comprising, after a predefined rollover period, clearing the call identifier from the call tracking repository.

11. A computing device comprising:
a memory, an output device, and a communications interface;
a processor interconnected with the memory, the output device, and the communications interface, the processor configured to:
receive, via the communications interface from a server, a call notification including a call identifier for a call;
provide a call alert at the output device;
send, to the server, a message including a registration request and the call identifier;
receive, from the server, handling parameters for handling the call, wherein the handling parameters comprise a status identifier indicating cancellation of the call; and
handle the call according to the handling parameters, by providing a cancellation alert at the output device.

12. The computing device of claim 11, wherein to provide the call alert, the processor is configured to: ring a ringer of the computing device and provide a visual notification at a display of the computing device.

13. The computing device of claim 11, wherein the handling parameters comprise a call invitation including connection parameters; and wherein to handle the call, the processor is configured to establish the call according to the connection parameters.

14. The computing device of claim 11, wherein the processor is further configured to terminate the call alert.

15. A call service server comprising:
a memory and a communications interface; and
a processor interconnected with the memory and the communications interface, the processor configured to:
receive a call destined for a target account, the call having a call identifier;
record the call identifier in a call tracking repository;
send a call notification to a computing device associated with the target account, the call notification including the call identifier;
receive, from the computing device, a message including a registration request and the call identifier;
in response to the registration request, determine handling parameters for the call identifier according to the call tracking repository; and
send, to the computing device, the handling parameters to the computing device.

16. The server of claim 15, wherein the processor is configured to store a status associated with the call identifier in the call tracking repository.

17. The server of claim 15, wherein the processor is further configured to:
receive a call cancellation for the call; and
update the call tracking repository to reflect the call cancellation.

18. The server of claim 17, wherein, to update the call tracking repository, the processor is configured to: remove the call identifier from the call tracking repository; or update a status associated with the call identifier in the call tracking repository.

19. The server of claim 15, wherein to determine the handling parameters, the processor is configured to:
determine whether the call is pending based on the call tracking repository;
when the call is pending, define the handling parameters to include connection parameters to allow the device to establish the call; and
when the call is not pending, define handling parameters to include a notification of an updated status of the call.

20. The server of claim 15, wherein the processor is further configured to, after a predefined rollover period, clear the call identifier from the call tracking repository.

* * * * *